Patented Dec. 8, 1925.

1,564,423

UNITED STATES PATENT OFFICE.

ARTHUR LÜTTRINGHAUS AND HUGO WOLFF, OF MANNHEIM, AND HEINRICH NERESHEIMER, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

MANUFACTURE OF BENZANTHRONE DERIVATIVES.

No Drawing. Application filed April 26, 1923. Serial No. 634,848.

*To all whom it may concern:*

Be it known that we, ARTHUR LÜTTRINGHAUS, HUGO WOLFF, and HEINRICH NERESHEIMER, citizens the first two of the German Empire, the third of the Kingdom of the Netherlands, residing the first two at Mannheim, the third at Ludwigshafen-on-the-Rhine, Germany, have invented new and useful Improvements in the Manufacture of Benzanthrone Derivatives, of which the following is a specification.

As is known benzanthrone and its derivatives can be converted into valuable dyestuffs by melting with caustic alkalies in the presence or absence of solvents or diluting media.

The present invention relates to the production, by alkaline condensation, of certain intermediate products and to the production of coloring matters with their aid.

We have discovered that benzanthrone or its derivatives can be transformed by the action of alkaline condensing agents, into condensation products which are not vat dyestuffs but which are very valuable intermediate products for the production of coloring matters. For obtaining the new condensation products the alkaline condensing agents are applied under more moderate conditions than are required for the formation of the known coloring matters from the benzanthrone compounds. Such conditions may consist in a lower temperature, shorter time of treatment, less concentrated condensing agents and so on, of which the lower temperature is the most important variation; however, the exact conditions depend on the circumstances in each case, the diluent or condensing means employed and the like and can be ascertained in each single case without difficulty.

As to the nature of the new compounds thus obtained it may be stated that it may be assumed from the results of analysis and the reactions of the compounds that they may be regarded as 2.2'-dibenzanthronyls, hitherto unknown of the following type:

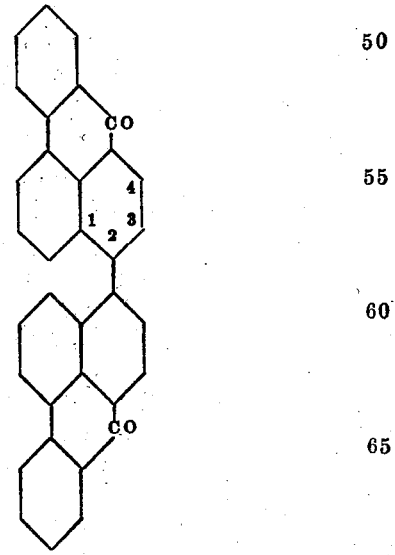

However, we do not wish to bind ourselves to this formula in any way.

The said intermediate products are very valuable in view of their being readily converted into vat coloring matters. The known dibenzanthrone dyestuffs are obtained by subjecting them to condensation in many various ways. It can be done in some cases by simply heating the intermediate products, or condensing agents of an acid or alkaline nature or of weakly oxidizing property can be employed. When condensing agents are applied that have also a halogenating or sulfonating action such as the free halogens or sulfuric acid, halogen or sulfonic acid derivatives of the dibenzanthrone may be formed. Products of a different nature are produced with good yields when the condensation is effected by means of strong oxidizing agents, oxygen being then introduced into the molecule simultaneously, and oxidized dibenzanthrone formed.

The nature of the invention will be more fully explained with reference to the following examples which however can be varied without departing from the scope of the said invention. The parts are by weight.

Example 1.

Introduce 50 parts of benzanthrone into a melt consisting of 500 parts of potassium hydroxid and 300 parts of ethyl alcohol the temperature not surpassing 100 degrees centigrade and stir continuously for some hours at from 95 degrees to 100 degrees centigrade. Then boil the melt with water, remove the solution by filtering and purifying the residue which is a dark powder, with a suitable solvent, for example acetone, to remove easily soluble by-products. A greenish-yellow product will be obtained which by crystallization from solutions of a high boiling point, preferably with the addition of animal charcoal, can be obtained in the form of small yellow needles melting above 300 degrees centigrade. They are difficultly soluble in glacial acetic acid, benzene, or acetone, and easily soluble in high boiling solvents such as nitrobenzene or trichlorbenzene, the solutions having a yellow color. In concentrated sulfuric acid the product dissolves with an intensely red color.

When condensation is performed at somewhat higher temperatures the final product may contain more or less dibenzanthrone, the known blue violet vat dyestuff, which may be removed by treating the product with an alkaline hydrosulfite solution.

Ethyl alcohol may be replaced by other alcohols, the temperature being suitably varied according to the special circumstances. In the case of methyl alcohol, for instance, somewhat higher temperatures are suitable, for example from 110 degrees to 115 degrees centigrade.

Example 2.

50 parts of benzanthrone are boiled under a reflux cooler with 75 parts of potassium hydroxid and 500 parts of monochlorbenzene for from 5 to 6 hours. The reaction product is freed from the solution by filtering or distilling with steam, and the remainder is treated with a hot alkaline hydrosulfite solution in order to remove the vat dyestuff which may have been formed simultaneously. The product may then be purified, if it should be found necessary, as described in the foregoing first example.

Example 3.

180 parts of benzanthrone are introduced at about 30 degrees centigrade into a solution of 240 parts of sodium anilide (prepared from 58 parts of metallic sodium) in 800 parts of anhydrous aniline in a current of nitrogen, whereupon the liquid is heated to 45 degrees centigrade for from 2 to 3 hours. The cherry-red solution is poured into dilute hydrochloric acid, whereby the reaction product is precipitated in the form of brownish red flakes which are filtered off, washed and dried. They can be further purified as described in Example 1, the final product thus obtained being identical with the product there described.

Example 4.

8.5 parts of sodium amid are introduced into 200 parts of mono-methyl-aniline in a current of nitrogen; the mixture is heated to about 180 degrees centigrade until ammonia is no longer generated. Then cool to about 75 degrees centigrade and add 20 parts of benzanthrone. After the temperature has been kept at from 75 degrees to 80 degrees centigrade for 2 hours, the reaction product is dissolved in dilute hydrochloric acid. The brownish-red body precipitated thereby is filtered off, washed and dried. The impurities contained therein may be extracted with boiling alcohol. The insoluble part which may be subjected to further purification, is identical with the compound obtained according to the foregoing Example 1.

In an analogous manner other condensing agents or diluents and derivatives of benzanthrone may be employed, the temperature being chosen in each case low enough to avoid the substantial formation of vat dyestuff. The conditions vary to some degree according to the circumstances of the case. For example, 6-methylbenzanthrone, when employed instead of benzanthrone in Example 1 will give a compound very similar to that obtained from benzanthrone itself; its melting point is above 350 degrees centigrade.

Example 5.

10 parts of the intermediate product obtained according to either of the aforesaid Examples 1 to 4 are mixed with 100 parts of 1.2.4.-tri-chlor-benzene, the mixture heated to from 140 degrees to 150 degrees centigrade and 25 parts of anhydrous aluminium chlorid are introduced at this temperature. The mixture is kept at this temperature while stirring until the formation of the dyestuff is completed. The product is freed from tri-chlor-benzene and aluminium chlorid in the usual way and is chemically identical with the known dibenzanthrone described for instance in the specification of Letters Patent No. 818,992.

Example 6.

10 parts of the intermediate product described in the foregoing Examples 1 to 4 are heated for a short time with 200 parts of sulfuric acid of 82 per cent and 1 part of mercuric sulfate to from 230 degrees to 240 degrees centigrade. The mass will thicken to a stiff paste. Pure dibenzanthrone can be obtained therefrom by filtering and washing first with sulfuric acid of 82 per cent and then with water.

*Example 7.*

10 parts of the condensation product obtained according to the foregoing Examples 1 to 4 are introduced at from 230 degrees to 240 degrees centigrade into 80 parts of fused potassium hydroxid and kept at this temperature for some hours while stirring. When cool, the melt is boiled with water while passing air through until the dibenzanthrone which has been formed with a nearly quantitative yield is precipitated. It is then filtered off and washed. The potassium hydroxid can also be employed in the presence of alcohols and other organic solvents, or diluents, such as aniline, naphthalene or others. Other alkaline condensing agents can also be employed.

*Example 8.*

25 parts of the condensation product prepared according to either of the foregoing Examples 1 to 4 are mixed with 150 parts of anhydrous ferric chlorid and 100 parts of dry common salt and heated to from 200 degrees to 210 degrees centigrade until a test portion after extraction with dilute hydrochloric acid is entirely soluble in an alkaline hydrosulfite solution.

The dyestuff produced contains chlorine; its reddish-violet vat dyes cotton a somewhat dull bluish-violet shade.

*Example 9.*

Work according to Example 5 substituting for aluminium chlorid 30 parts of anhydrous ferric chlorid. A chlorinated dibenzanthrone is obtained, dyeing cotton from a blue vat more bluish and purer shades than dibenzanthrone.

It dissolves in high boiling solvents with a reddish-violet color and an intensely red fluorescence and in sulfuric acid with a violet color.

*Example 10.*

10 parts of the condensation product described in the foregoing Examples 1 to 4 are dissolved in 100 parts of chlorosulfonic acid and chlorine is introduced at from 20 degrees to 25 degrees centigrade until a test portion of the reaction product is for the most part soluble in alkaline hydrosulfite solution with a greenish-blue color. The solution is then poured on ice, the dyestuff filtered off and washed. It can be purified by treating with acetone or other low boiling solvents. From the greenish-blue vat cotton is dyed brilliant violet shades of very good fastness. The solution in high boiling organic solvents shows a color similar to that of the dyestuff described in the foregoing example. In concentrated sulfuric acid the dyestuff dissolves with a crimson red color.

*Example 11.*

10 parts of metallic sodium are dissolved in 400 parts of anhydrous aniline, while heating in an atmosphere of nitrogen, then 30 parts of the condensation product prepared according to the foregoing Examples 1 to 4 are introduced into the solution thus formed of sodium anilide in aniline at a temperature of 160 degrees centigrade. The mixture is then heated to the boiling temperature until the formation of the dyestuff no longer increases. When cold, the reddish-violet mass is poured into diluted hydrochloric acid, the precipitated coloring matter is filtered off, washed and dried. It may be purified by boiling with organic solvents. Metallic sodium may be replaced by other like metals, such as potassium, calcium, magnesium, aluminium and even other compounds of aromatic amines and like metals may be used such as sodium-monomethylanilide.

*Example 12.*

The condensation product obtained according to the Examples 1 to 4 is treated with fuming sulfuric acid containing about 10 per cent of sulfuric acid anhydrid at a low temperature. A sulfonic acid is formed representing a greenish-yellow powder, dissolving with a yellow color in water and in sulfuric acid with a red color. 10 parts of this sulfonic acid are heated for half an hour to from 200 degrees to 210 degrees centigrade with 120 parts of sulfuric acid of 90 per cent and 1 part of mercuric sulfate. Dibenzanthrone-sulfonic acid is formed which separates from the mixture when still hot, it is filtered off when cool, washed with sulfuric acid of 90 per cent and then dissolved in boiling water and precipitated by the addition of sodium chlorid in the form of its sodium salt. The latter dissolves with a blue color in water and in concentrated sulfuric acid with a violet color.

*Example 13.*

10 parts of the intermediate product described in the foregoing Examples 1 to 4 are dissolved in 100 parts of concentrated sulfuric acid and a paste prepared from 35 parts of manganese dioxid and 210 parts of concentrated sulfuric acid is introduced at a temperature not surpassing 25 degrees centigrade. The mixture is then stirred for about an hour while maintaining this temperature, poured into water and the yellowish-brown precipitate formed is filtered off. When dry, it dissolves in sulfuric acid with a reddish-brown color. In dilute acids and alkalies it is insoluble. When treated with reducing agents, such as bisulfite solution, it assumes a blue color. The reduction product can be retransformed into the yellowish-brown compound by the action of oxidizing means. The reduction product dissolves in very dilute hot caustic soda solution with a yellowish-green color, and with alkaline hydrosulfite solution it produces a greenish-blue vat from which cotton is dyed green shades.

*Example 14.*

10 parts of the sulfonated intermediate product described in Example 12 are dissolved in 100 parts of concentrated sulfuric acid and a mixture of 25 parts of lead superoxid and 50 parts of sulfuric acid is added at from 0 degrees to 5 degrees centigrade. When the formation of the dyestuff is finished, the mass is poured into water, boiled whilst adding some sodium bisulfite, the blue solution is then filtered off from the lead sulfate and precipitated with sodium chlorid. The precipitated product dissolves in dilute acids with a blue color and in alkalies with a green color. By the addition of oxidizing agents the blue colored acid solution turns yellowish-brown but the blue color is restored by the addition of reducing agents for example sodium bisulfite. A brilliant greenish blue vat is produced with alkaline hydrosulfite solution.

What we claim is:—

1. In the manufacture of benzanthrone derivatives, converting a benzanthrone compound into condensation products (which are not vat coloring matters) by treating the benzanthrone compound with an alkaline condensing agent at a more moderate temperature than that leading to vat coloring matters.

2. In the manufacture of benzanthrone derivatives, converting a benzanthrone compound into condensation products (which are not vat coloring matters,) by treating the benzanthrone compound with an alkaline condensing agent at a more moderate temperature than that leading to vat coloring matters and separating from vat coloring matter if such be present.

3. The manufacture of benzanthrone derivatives by treating a benzanthrone body with an alkaline condensing agent at a more moderate temperature than that leading to the substantial formation of vat coloring matters, separating from vat coloring matter if such be present and subjecting the condensation product to further condensation.

4. The manufacture of benzanthrone derivatives by treating a benzanthrone body with an alkaline condensing agent at a more moderate temperature than that leading to the substantial formation of vat coloring matters, separating from vat dyestuff, if any such be present, and treating the product with a strongly oxidizing condensing agent.

5. As a new article of manufacture a condensation product of benzanthrone which compound is insoluble in alkaline hydrosulfite solution and has a melting point above 300 degrees centigrade and dissolves in high boiling organic solvents with a yellow color and in concentrated sulfuric acid with a red color, and which when heated with sulfuric acid of 82 per cent and a little mercuric sulfate to about 210 degrees centigrade or more or when treated with other condensing agents is transformed into a dibenzanthrone.

In testimony whereof we have hereunto set our hands.

ARTHUR LÜTTRINGHAUS.
HUGO WOLFF.
HEINRICH NERESHEIMER.